US012644713B2

(12) United States Patent
Wappler et al.

(10) Patent No.: US 12,644,713 B2
(45) Date of Patent: Jun. 2, 2026

(54) METHOD AND ASSISTANCE APPARATUS FOR SUPPORTING VEHICLE FUNCTIONS IN A PARKING LOT, AND MOTOR VEHICLE

(71) Applicant: Volkswagen Aktiengesellschaft, Wolfsburg (DE)

(72) Inventors: Stefan Wappler, Söllingen (DE); Timo Iken, Wolfsburg (DE); Niklas Koch, Tappenbeck (DE); Roland Kube, Schwülper (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 165 days.

(21) Appl. No.: 18/687,699

(22) PCT Filed: Aug. 11, 2022

(86) PCT No.: PCT/EP2022/072597
§ 371 (c)(1),
(2) Date: Feb. 28, 2024

(87) PCT Pub. No.: WO2023/030858
PCT Pub. Date: Mar. 9, 2023

(65) Prior Publication Data
US 2024/0393116 A1 Nov. 28, 2024

(30) Foreign Application Priority Data
Aug. 31, 2021 (DE) ..................... 10 2021 209 575.5

(51) Int. Cl.
*G01C 21/32* (2006.01)
*B60W 30/06* (2006.01)
(Continued)

(52) U.S. Cl.
CPC ............. *G01C 21/32* (2013.01); *B60W 30/06* (2013.01); *G06V 20/586* (2022.01);
(Continued)

(58) Field of Classification Search
CPC . B60W 30/06; G06V 20/586; G01C 21/3804; B62D 15/0285
See application file for complete search history.

(56) References Cited

U.S. PATENT DOCUMENTS 8,594,923 B2 11/2013 Wong et al. .................. 701/409
9,488,725 B2 11/2016 Max et al.
(Continued)

FOREIGN PATENT DOCUMENTS

CN 112966622 A 6/2021 ............... G06K 9/00
DE 102009016562 A1 11/2009 ............... B60R 1/00
(Continued)

OTHER PUBLICATIONS

German Office Action, Application No. 102021209575.5, 6 pages, May 19, 2022.
(Continued)

*Primary Examiner* — Helal A Algahaim
(74) *Attorney, Agent, or Firm* — Slayden Grubert Beard PLLC

(57) ABSTRACT

The disclosure relates to a method and an assistance apparatus for supporting vehicle functions in a parking lot. Surroundings data are recorded and processed in order to recognize semantic and/or geometric objects, wherein the surroundings data depict the parking lot or represent same in the form of a point cloud. Data portions are extracted from the surroundings data, these data portions corresponding to semantic and/or geometric objects that have been classified as relevant to a parking maneuver and comprising pixels or data points that depict or represent the recognized semantic
(Continued)

and/or geometric objects. Of the surroundings data, only the extracted data portions together with object data that, as a semantic and/or geometric attribution of the data portions, in each case indicate to which at least one semantic and/or geometric object the data portions correspond, are then sent to a server in order to automatically create an overall map.

20 Claims, 1 Drawing Sheet

(51) Int. Cl.
| | |
|---|---|
| *G06V 20/56* | (2022.01) |
| *G06V 20/58* | (2022.01) |
| *H04W 4/44* | (2018.01) |
| *G06F 16/29* | (2019.01) |

(52) U.S. Cl.
CPC ............ *G06V 20/588* (2022.01); *H04W 4/44* (2018.02); *G06F 16/29* (2019.01)

(56) References Cited

U.S. PATENT DOCUMENTS

| | | | | |
|---|---|---|---|---|
| 10,210,406 | B2 | 2/2019 | Huang et al. | |
| 10,762,673 | B2 | 9/2020 | Luo et al. | |
| 2011/0044543 | A1 | 2/2011 | Nakamura et al. | ........... 382/190 |
| 2016/0187144 | A1 | 6/2016 | Modica et al. | ............... 382/154 |
| 2018/0045521 | A1 | 2/2018 | Wege et al. | |
| 2018/0216937 | A1 | 8/2018 | Mielenz et al. | |
| 2018/0336421 | A1 | 11/2018 | Huang et al. | |
| 2020/0043189 | A1 | 2/2020 | Bao et al. | |
| 2020/0109954 | A1 | 4/2020 | Li et al. | |
| 2020/0160151 | A1 | 5/2020 | Urtasun et al. | |
| 2020/0208994 | A1 | 7/2020 | Askeland et al. | |
| 2020/0278217 | A1 | 9/2020 | Ahmad et al. | |
| 2020/0309541 | A1 | 10/2020 | Lavy et al. | |
| 2020/0356100 | A1 | 11/2020 | Nagarajan et al. | |
| 2020/0372285 | A1 | 11/2020 | Adams et al. | |
| 2021/0031795 | A1 | 2/2021 | Bariant et al. | |
| 2021/0063198 | A1 | 3/2021 | Nister et al. | |
| 2021/0096241 | A1 | 4/2021 | Bongio et al. | |
| 2021/0231769 | A1 | 7/2021 | Zaum et al. | |
| 2021/0325206 | A1 * | 10/2021 | Beleznai | ............. G08G 1/0112 |

FOREIGN PATENT DOCUMENTS

| | | | | |
|---|---|---|---|---|
| DE | 102014015073 | A1 | 4/2016 | ........... B60W 30/06 |
| DE | 102016214868 | A1 | 2/2018 | ........... G01C 21/26 |
| DE | 102017201664 | A1 | 8/2018 | ........... G01C 21/30 |
| DE | 102018001004 | A1 | 8/2018 | ........... B60R 16/02 |
| DE | 102018218436 | A1 * | 5/2019 | ............. G06T 7/60 |
| DE | 102018101388 | A1 | 7/2019 | ........... B60W 30/06 |
| DE | 102018213007 | A1 | 2/2020 | ............. G08G 1/14 |
| DE | 102018214971 | A1 | 3/2020 | ........... B60W 40/02 |
| DE | 102018128531 | A1 | 5/2020 | ............. G06K 9/62 |
| DE | 102019206990 | A1 | 11/2020 | ........... B60W 40/02 |
| DE | 102021003567 | A1 | 8/2021 | ............. G06K 9/62 |
| DE | 102020210421 | A1 | 2/2022 | ........... B60W 40/02 |
| DE | 102021209575 | B3 | 1/2023 | ........... B60W 30/06 |
| EP | 3330946 | A1 | 6/2018 | ............. G06T 1/00 |
| IN | 202011017902 | A | 4/2020 | ........... B61L 27/04 |
| IN | 202041055232 | A | 12/2020 | ........... G06K 90/00 |
| KR | 20180052028 | A | 5/2018 | ........... B60W 30/06 |
| WO | 2020/229841 | A1 | 11/2020 | ........... G06Q 10/06 |
| WO | 2021/161614 | A1 | 8/2021 | ............. G08G 1/00 |
| WO | 2023/030858 | A1 | 3/2023 | ........... B60W 30/06 |

OTHER PUBLICATIONS

International Search Report and Written Opinion, Application No. PCT/EP2022/072597, 8 pages, Dec. 12, 2022.

* cited by examiner

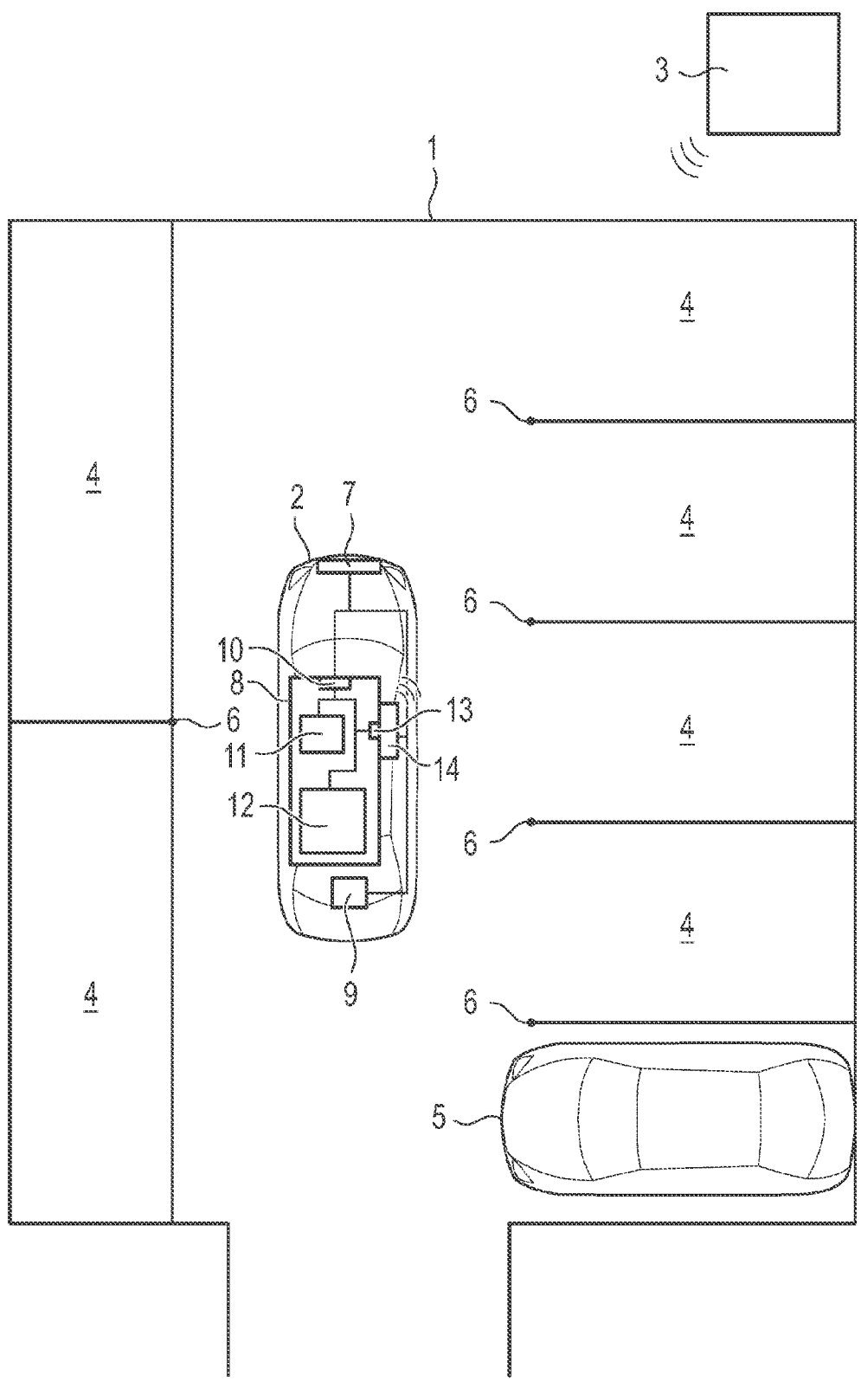

METHOD AND ASSISTANCE APPARATUS FOR SUPPORTING VEHICLE FUNCTIONS IN A PARKING LOT, AND MOTOR VEHICLE

CROSS-REFERENCE TO RELATED APPLICATIONS

This application claims priority to German Patent Application No. DE 10 2021 209 575.5, filed on Aug. 31, 2021 with the German Patent and Trademark Office. The contents of the aforesaid patent application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

One approach for automating driving functions consists in providing and using digital maps, for example as a basis for localization, path planning, finding points of interest, and/or the like. However, maps with the required level of detail and reliability are not yet widely available. In addition, keeping such maps up-to-date is a challenge.

SUMMARY

A need exists to allow for efficient and effective support for at least semi-automated vehicle or driving functions.

The need is addressed by the subject matter of the independent claims. Embodiments of the present invention are disclosed in the dependent claims, in the description, and in the FIGS.

BRIEF DESCRIPTION OF THE DRAWINGS

The only FIG. shows a schematic, example overview for illustrating automated support of at least semi-automated vehicle functions.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A method according to some embodiments is used to support implementation of at least semi-automated driving or vehicle functions of a motor vehicle in a parking lot. A parking lot within the context of the present invention may be a public or private car park, a parking lane, or the like, i.e., in general terms, an area with one or more regions for parking one or more motor vehicles. The parking lot may also comprise boundaries, guidance elements, equipment or infrastructure elements, and/or the like. The parking lot may extend over one or more levels, comprise an outside region or inside region, for example a parking garage, and/or the like.

In some embodiments, the method comprises multiple method steps which can be executed, in particular, automatically or semi-automatically. The method steps can be repeated, in particular repeated or run through continuously or regularly.

In one method step and according to some embodiments, surroundings data are recorded in the parking lot by way of a surroundings sensor system of a motor vehicle, which surroundings data depict or characterize respectively current surroundings of the motor vehicle, i.e., in this case the parking lot, in particular. The surroundings sensor system may, for example, be or comprise a camera, a lidar apparatus, a radar apparatus, an ultrasonic sensor system, and/or the like. Accordingly, the surroundings data may depict the surroundings or rather the parking lot or represent same by means of a point cloud, or the like. The surroundings data may therefore comprise a camera image, lidar dataset, radar dataset, ultrasonic dataset, and/or the like.

In another method step and according to some embodiments, the surroundings data are processed by means of a corresponding data processing or assistance apparatus of the motor vehicle in order to recognize semantic and/or geometric objects. The surroundings data here are thus classified semantically and/or geometrically, for example in that a corresponding algorithm is applied to the surroundings data for object or shape recognition and/or for semantic segmentation or the like. Therefore, corresponding features that describe or characterize the objects or correspond to the objects can be extracted from the surroundings data. These features can then be used in other method or processing steps, for example instead of the complete surroundings data, in order to reduce the data processing workload.

In another method step and in some embodiments, data portions are extracted from the surroundings data by way of the data processing or assistance apparatus of the motor vehicle, these data portions corresponding to semantic and/or geometric objects that have been classified as relevant to a parking maneuver. Classification of this kind may, for example, be carried out automatically by means of the motor vehicle or rather the data processing or assistance apparatus. Equally, the classification may be predefined, for example, in the form of a corresponding table or list of relevant objects or types of objects. A predefined classification of this kind may then be stored, for example, in a data memory of the data processing or assistance apparatus. A parking maneuver in the present context may be or comprise a, in particular automated, maneuver of the motor vehicle for navigating or moving onward in the parking lot, for example driving in, driving out, moving into a parking space, moving out of a parking space, and/or the like. The parking maneuver may also be or comprise a shunting maneuver of the motor vehicle in the parking lot. The data portions are or comprise pixels or data points that depict, represent, or characterize the recognized relevant semantic and/or geometric objects.

Semantic objects relevant to a parking maneuver in the present context may be surroundings objects which are classified semantically, i.e., in terms of their nature, type, or significance, and which are to be taken into account or are or may be of interest for successful performance of the parking maneuver. In some embodiments, parking space markings or boundaries, travel path boundaries, and/or location markers, in particular, are predefined as relevant semantic objects of this kind. Location markers in the present context may be objects or markings which allow for at least relative position determination. Location markers of this kind may, for example, have a shape and/or be provided with a pattern or marking which allows for determination of the pose of the location marker regardless of the viewing angle and thus also determination of a pose of the recording motor vehicle, may be arranged in a predefined fixed formation with respect to one another which allows for position determination, may output a reference signal for position determination, and/or the like.

Geometric objects relevant to a parking maneuver in the present context may be or comprise geometric features, shapes, structures, or patterns contained or depicted in the surroundings data and which may each represent a particular surroundings object or a combination or group of surroundings objects. These may be, for example, lines, points, rectangles, which may optionally be distorted in perspective, cylinders, as well as groupings or relevant arrangements thereof. The geometric objects may be semantically identified or semantically unspecified or be or remain unrecognized. The latter may, for example, be the case if semantic object recognition cannot semantically classify, i.e., recognize, a corresponding object, and/or if semantic classification is not required, for example because particular geometric objects or structures are always classified as relevant to a parking maneuver regardless of their semantic nature or significance and/or a recognized geometric object already applies as relevant to a parking maneuver based on its position alone, for example relative to a parking space or a travel path. In the latter case, a geometric object of this kind may, for example, be generally classified as an obstacle without it having to be semantically identified precisely.

The semantic and/or geometric objects may be recognized as 2D objects, i.e. described, for example, by way of their 2D position and/or 2D orientation in a 2D surroundings dataset. Equally, the objects may be recognized as 3D objects or as 2D objects or 2D surfaces embedded in 3D surroundings and may accordingly be described, for example, by way of their 3D position and/or 3D orientation in a 3D surroundings dataset.

The semantic and/or geometric objects or rather recognition thereof may make it possible, in a particularly simple and reliable manner, to successfully perform different parking maneuvers in the relevant parking space.

In another method step and in some embodiments, not all recorded surroundings data, but rather only the data portions extracted therefrom together with object data that, as a semantic and/or geometric attribution of the data portions, in each case indicate to which semantic and/or geometric object or to which semantic and/or geometric objects the data portions correspond, are sent to a server apparatus in order to automatically create an overall map. Therefore, a semantic and/or geometric attribution of the data portions can be carried out, in particular on the vehicle side. By evaluating this semantic and/or geometric attribution, the server apparatus can identify and form corresponding relevant objects, i.e. enter same into the overall map. The server apparatus may, for example, be a so-called back end, a cloud server, a computing center, or the like. The data portions and the object data may, for example, be sent to the server apparatus by way of a corresponding communication module of the assistance apparatus or of the motor vehicle, in particular via a wireless or cable-free data connection, for example a cellular or WLAN connection or the like.

The described processing or the extraction of the data portions as well as, optionally, the combination or assignment of the data portions with or to the object data may, in particular, be carried out on the vehicle side, i.e., for example, by means of the above-mentioned data processing or assistance apparatus of the motor vehicle. As a result, a volume of data to be sent from the motor vehicle to the server apparatus can be significantly reduced, for example in comparison to transmission of all recorded surroundings data or complete description of the surroundings including all surroundings objects that are ultimately not relevant to successful performance of maneuvers. As a result, the method according to the invention can be applied in a particularly reliable manner, since, for example, mobile or rather wireless data connections or corresponding data networks with a sufficiently large bandwidth are not available everywhere. Therefore, on account of this and by collecting the data portions centrally in the server apparatus, particularly complete and particularly up-to-date data are available in a particularly simple and particularly reliable manner. Since the recording and transmission of data can be carried out by a plurality of correspondingly configured motor vehicles, an overall map that can be particularly up-to-date and have a particularly large area coverage can thus be generated in a particularly simple, effective, and efficient manner in the server apparatus or by means of the server apparatus. An overall map of this kind may serve as a data base for automated vehicle or driving functions, which can thus be executed in a particularly accurate, reliable, and safe manner.

The server apparatus may collect or aggregate the data, i.e. the extracted data portions and the associated object data, i.e. in particular from a vehicle fleet, in other words from a plurality of corresponding motor vehicles, and combine or fuse said data into the overall map. An overall map of this kind may then contain more or other data than each individual fleet vehicle, i.e. each motor vehicle participating in the method or configured for the method, has individually recorded or sent. The overall map may, in particular, be a 3D map of at least one or more parking lots. For this purpose, 3D objects to be entered into the map can be automatically reconstructed heuristically, for example if the sent data portions are 2D data, in particular if same depict or characterize the semantic and/or geometric objects from different viewing angles.

The generated or respectively updated overall map or local sections of the overall map that are relevant to a motor vehicle in each case depending on a relevant vehicle position of said motor vehicle can be sent from the server apparatus to the relevant motor vehicle. This can be done, for example, in response to a corresponding request from the motor vehicle. Equally, the server apparatus may make the overall map available completely or in part for retrieval by a motor vehicle or the motor vehicles or rather the data processing or assistance apparatus thereof.

The motor vehicle may use the overall map or the respectively required local sections of the overall map to execute the at least semi-automated vehicle or driving functions, for example at least semi-automated navigation or maneuvering in the parking lot.

The above-mentioned motor vehicle or rather the motor vehicles participating in the method or configured for the method may, for example, be passenger cars, trucks or, for example, aircraft, for which a parking area on an airport site, for example, may be relevant.

In some embodiments of the present invention, in each case the semantic and/or geometric objects are recognized in the surroundings data and/or the corresponding data portions are also extracted based on predefined prior knowledge of relevant map content, in particular for parking maneuvers and/or in parking lots generally or specifically for the relevant individual parking lot. Such prior knowledge may be predefined, for example, in the form of a list with relevant objects and/or the like to be expected and/or checked. This can be used to effectively limit or restrict a search, target, or result space for object recognition, which in turn can simplify clear, correct, and reliable object recognition. Equally, prior knowledge of object sizes and/or object shapes or the like can be predefined, for example. This can make possible particularly simple or efficient extraction of corresponding data portions relating to a recognized object from the surroundings data. This makes it possible, for example, to ensure in a particularly reliable manner that a particular object is contained or depicted in all sent data portions or only in actually relevant portions depending on the implementation or requirements, for example if recognition was incomplete or the object was only detected incompletely, for example due to concealment, sensor impairment, or the like.

If, for example, the prior knowledge specifies a basic structure of the parking lot and/or positions of particular semantic and/or geometric objects, for example according to surroundings data already gathered in the past or according to a construction plan or the like, relevant regions or objects can be recorded in a targeted manner and thus detected in a particularly reliable manner. For this purpose, the surroundings sensor system may be directed at corresponding regions, positions, or objects, for example. Equally, the surroundings sensor system may be set or operated for particularly accurate or reliable detection or recognition of corresponding regions, positions, or objects, for example by accordingly adapting a recording characteristic, a focus, one or more operating parameters, by means of an increased recording time or recording frequency, and/or the like. This can ultimately lead or contribute to particularly accurate and reliable mapping of the parking lot.

In some embodiments, a trajectory actually traveled by the motor vehicle in the parking lot is determined or detected and also sent to the server apparatus. The trajectory actually traveled may, for example, be determined or specified relative to one or more recognized surroundings objects and/or relative to a stationary global coordinate system. The trajectory actually traveled may, depending on potentially faulty sensor-based surroundings recognition, provide reliable data about navigable regions or routes as well as data regarding a viewpoint of the surroundings sensor system onto the recognized semantic and/or geometric objects. This can make it possible to categorize the sent data in a more accurate and reliable manner as well as to validate or check the plausibility of the overall map created based thereon. The actually traveled trajectory may be determined, for example, using a global navigation satellite system for position determination, based on an intrinsic odometry of the motor vehicle, dead reckoning proceeding from a reference point, and/or the like.

In some embodiments, the surroundings data are recorded at points in time which have been or are determined according to a predefined criterion or schema. In particular, the surroundings data may only be recorded at such points in time. Such limited or strategically determined recording of the surroundings data can reduce or limit a volume of data to be sent to the server apparatus and/or can lead or contribute to particularly accurate and reliable detection of the surroundings or individual parts or objects of the surroundings or rather of the relevant parking lot. As a result, the method can ultimately be carried out in a particularly efficient and/or particularly effective manner. The criterion can, for example, be rigidly defined or dynamically adapted, for example depending on properties of the relevant parking lot, a speed of the motor vehicle, respective ambient or recording conditions, and/or the like.

In a possible development of the present invention, the predefined criterion defines a predefined route, new surroundings data being recorded in each case after the motor vehicle has covered said route. In other words, a route-based criterion is provided here. Accordingly, surroundings data can then be recorded in each case if the motor vehicle has moved by X meters from the position at which or since the point time at which surroundings data were last recorded. X may be a predefined number, for example depending on given requirements. For example, it can be predefined that new surroundings data, i.e., for example, a new camera image, a new lidar or radar dataset, or the like, is recorded in each case if the motor vehicle has covered 0.5 m, i.e. has moved onward by 0.5 m. As a result, a degree of redundancy of the recorded surroundings data can be reduced and thus a corresponding data transmission and/or data processing workload can be reduced in order to increase the efficiency of the method.

In a possible development, the predefined criterion defines a predefined change or minimum change in a recording angle of the surroundings sensor system onto the or with respect to the surroundings, in particular with respect to a relevant semantic and/or geometric object in the surroundings, new surroundings data being recorded after said change or minimum change has been achieved, in particular only after said change or minimum change has been achieved. In other words, an angle-based or viewing direction-based criterion is provided here. Accordingly, new surroundings data can then be recorded in each case or rather the relevant object can be detected, recorded, or depicted again in each case, in particular only, if or as soon as a recording or viewing angle of the surroundings sensor system onto the surroundings or the relevant object has changed at least by the predefined change. The recording or viewing angle or rather the change thereof may, for example, be predefined, defined and/or measured or determined relative to the relevant object and/or relative to a stationary global coordinate system. This makes it possible to ensure that new recorded surroundings data in each case contains additional information with respect to the last recorded surroundings data. As a result, processing and transmission of redundant, i.e. the same or identical surroundings data, can be prevented or reduced, but the overall map can still ultimately be generated in a particularly accurate, detailed, and reliable manner. The embodiment of the present invention proposed here also makes it possible to further improve the efficiency and effectiveness of the method according to the invention.

In some embodiments, uncertainty data that indicate an at least estimated relevant reliability are determined or taken into account for the semantic and/or geometric objects and/or for the corresponding extracted data portions. This can mean, for example, that the uncertainty data are also sent to the server apparatus. The server apparatus may then process the received surroundings and object data into the overall map or incorporate same into the overall map in consideration of the uncertainty data or rather the uncertainties indicated by said data. Equally, the uncertainty data may already be taken into account in the relevant motor vehicle, for example by means of the data processing or assistance apparatus thereof. For example, the uncertainty data and a threshold value predefined therefor can be used to automatically decide whether the respective data portions and/or object data are even sent to the server apparatus. This can prevent surroundings data with too high an uncertainty, i.e. too low a confidence, from ultimately being included in the overall map. As a result, the reliability of the overall map and thus ultimately safety during execution of automated vehicle or driving functions based thereon can be improved. In addition, a workload for sending corresponding surroundings data and for processing same by means of the server apparatus can be saved in order to further improve the efficiency of the method according to the invention. Equally, the uncertainty data can be taken into account, for example on the vehicle side, during creation of a local partial map. Such creation of a local partial map by the motor vehicle or in the motor vehicle is described in more detail elsewhere.

In a possible development, the uncertainty data are determined based on respective recording conditions for the surroundings data. For this purpose, an ascertained quality of a calibration of the surroundings sensor system, an ascertained distance between a relevant semantic and/or geometric object and the surroundings sensor system, an ascertained angular position of the relevant object relative to the surroundings sensor system, and/or respectively current visibility and/or weather conditions, by means of which the surroundings sensor system or rather the recording of the surroundings data by the surroundings sensor system may be influenced or impaired, can be taken into account, in particular. For example, a lower calibration quality, a greater distance, or positions of the relevant object outside a predefined or defined core detection range of the surroundings sensor system in which maximum accuracy, reliability, or resolution is given, a lower ambient brightness, direct exposure of the surroundings sensor system to sunlight, the presence of fog, heavy rain, or snowfall, and/or the like can lead to an accordingly greater uncertainty. In this way, the reliability of the extracted data portions and/or of the recognized objects, i.e. the corresponding object data, can be determined in a simple, accurate, and reliable manner.

In a possible development, the uncertainty data are ascertained based on odometry data that characterize a proper motion of the motor vehicle and/or based on an ascertained or performed assessment of such odometry data. For example, a greater uncertainty can be determined if a travel or movement speed and/or a yaw rate of the motor vehicle is greater or above a relevant predefined threshold value. This makes it possible to take into account the fact that, at correspondingly high speeds and/or yaw rates, motion blur or a reduced acuity or detail resolution of the recorded surroundings data, for example, can result. Therefore, the embodiment of the present invention proposed here can also contribute to particularly accurate and reliable determination of the uncertainty data.

By taking into account the uncertainty data, for example when multiple sets of uncertainty data are available for the same parking lot, in each case the surroundings data that has lower uncertainty can be used to generate the overall map. Equally, a corresponding warning or a corresponding notice may be provided, for example for parts or sections of the overall map, i.e. corresponding regions for which only surroundings data with an uncertainty that is above a predefined threshold value are available or underlying. This may then, for example, be taken into account by a motor vehicle during at least semi-automated operation, for example in that increased attentiveness of a driver or takeover of control or steering of the motor vehicle by the driver is automatically requested.

In some embodiments, a local partial map is generated on the vehicle side, i.e., for example, by means of the above-mentioned data processing or assistance apparatus of the motor vehicle configured for executing the method, based on the recorded surroundings data, in particular only based on the extracted data portions and the semantic and/or geometric objects recognized therein or rather the corresponding object data. The objects classified as relevant can be entered in said local partial map, i.e. bundled and set in relation to one another and/or to the surroundings or rather a predefined, e.g. stationary global, coordinate system. Equally, further available data, such as the above-mentioned uncertainty data, time stamps of the surroundings data, and/or the like, can optionally also be entered or taken into account in the partial map. The local partial map is then sent to the server apparatus. The partial map can be sent to the server apparatus in addition to the extracted data portions and the associated object data. Equally, the extracted data portions and the associated object data may be sent as part of the partial map to the server apparatus or processed in the partial map and in this sense at least implicitly sent to the server apparatus when the partial map is sent. The partial map may, in particular, be a 3D map, in the same way as the overall map that is generated or can be generated by the server apparatus. For this purpose, corresponding 3D surroundings data can be recorded and processed or the objects recognized in the recorded surroundings data can be reconstructed heuristically therefrom as 3D objects. Due to the vehicle-side generation and sending of the partial map to the server apparatus, the overall map can be generated in a particularly simple and fast manner by means of the server apparatus by putting together multiple such sent or rather received partial maps. In addition, the local partial map generated on the vehicle side can be used by the motor vehicle in a particularly timely manner, in particular during the same journey, to navigate or maneuver in the relevant parking lot. For example, the partial map can be generated when driving into the parking lot and when driving through the parking lot to a particular parking space and then used to navigate or maneuver in the opposite direction out of the parking lot at the end of the stay there, in particular if no contact with the server apparatus was possible in the meantime or, for example, not enough bandwidth of a data connection was available for retrieving an accordingly updated map of the parking lot from the server apparatus.

In a possible development, odometry data that indicate or characterize a proper motion of the motor vehicle are gathered on the vehicle side, i.e. in the vehicle, by the vehicle, or by an apparatus of the motor vehicle. The recognized semantic and/or geometric objects are then entered into the partial map using the odometry data. In other words, the odometry data, which may define a relevant position of the motor vehicle at a time of recording of the surroundings data, may be used for a location or relative positioning of the objects in the partial map, for example with respect to a local or stationary global coordinate system. The odometry data may thus constitute or form a reference and/or additional validation for the spatial structure of the partial map. Thus, the positions or relative positional relationships of the objects do not have to be ascertained exclusively based on the surroundings data. This can make possible particularly accurate and reliable generation of the partial map, in a similar manner to the server-side generation of the overall map using or taking account of the trajectory of the motor vehicle sent from the vehicle to the server apparatus, as described elsewhere.

Another aspect of the present invention relates to a method for supporting implementation of at least semi-automated vehicle or driving functions of a motor vehicle in a parking lot by means of a central server apparatus. As described in connection with the other method according to the invention, said central server apparatus gathers data sent to the server apparatus, i.e. data portions of surroundings data recorded on the vehicle side and corresponding object data which indicate or describe semantic and/or geometric objects recognized therein, which originate from a plurality of motor vehicles. Based on said gathered data, the central server apparatus then generates and/or updates a, in particular three-dimensional, overall map. For this purpose, the data gathered by the server apparatus from different motor vehicles and/or at different points in time can be combined or fused with one another and/or with an existing or previous overall map, for example using a bundle adjustment method. The server apparatus provides the overall map generated or updated in this manner to the motor vehicles, i.e. sends same in full or in part to the motor vehicles or makes same available for retrieval by the motor vehicles. The central server apparatus, by means of which the server-implemented method proposed here is or can be carried out, in particular automatically or semi-automatically, may in particular be or correspond to the server apparatus mentioned in connection with the other method according to the invention that is or can be executed on the vehicle side.

A server apparatus of this kind may in turn be another aspect of the present invention. Said server apparatus according to the invention may thus be configured to carry out the corresponding method according to the invention that is to be executed or can be executed on the server side. For this purpose, the server apparatus may comprise an interface for gathering or receiving data sent from motor vehicles, a computer-readable data memory, and a processor apparatus, i.e., for example, at least one microchip, microprocessor, or microcontroller. The interface may also be used or configured to output or provide an overall map generated by means of the processor apparatus and data memory or the server apparatus may comprise a corresponding output interface. An operating or computer program that encodes or implements the method steps of the corresponding method according to the invention or corresponding control instructions and that can be executed by the processor apparatus in order to cause or prompt execution of the corresponding method may be stored in the computer-readable data memory.

Another aspect of the present invention relates to an assistance apparatus for a motor vehicle. The assistance apparatus according to the invention comprises an input interface for gathering surroundings data that may have been recorded, for example, by means of a surroundings sensor system, as well as a computer-readable data memory, a processor apparatus coupled thereto, i.e., for example, a microchip, microprocessor, or microcontroller, and an output interface for outputting result data generated based on the surroundings data. The assistance apparatus according to the invention is configured to execute, in particular automatically or semi-automatically, the method according to the invention that is to be executed or can be executed on the vehicle side. The assistance apparatus according to the invention may, in particular, accordingly be or correspond to the data processing or assistance apparatus mentioned in connection with this method. The result data may, in particular, accordingly be or comprise the extracted data portions as well as the corresponding object data. Equally, the result data may, for example, include the local partial map mentioned elsewhere, the certainty data mentioned elsewhere, and/or the like. The assistance apparatus according to the invention may comprise some or all of the properties and/or features mentioned in connection with the other aspect of the present invention and/or be configured for some or all of the method steps, measures, or processes mentioned in connection with the method according to the invention.

Another aspect of the present invention relates to a motor vehicle which comprises a surroundings sensor system, an assistance apparatus according to the invention, and a communication module for sending data to a server apparatus, in particular wirelessly or in a cable-free manner. The communication module may be part of the assistance apparatus or be an apparatus separate therefrom. The motor vehicle according to the invention may, in particular, be or correspond to the motor vehicle mentioned in connection with the other aspects of the present invention. Accordingly, the motor vehicle according to the invention may comprise some or all of the properties and/or features mentioned in these connections and/or be configured for method steps, measures, or processes mentioned at those points.

Other features of the invention can be found in the following description of the FIG. and with reference to the drawing. The above features and combinations of features mentioned above in the description, as well as the features and combinations of features presented below in the description of the FIG. and/or just in the FIG. can be used not only in the indicated combination, but also in other combinations or by themselves without departing from the scope of the invention.

BRIEF DESCRIPTION OF THE DRAWING

Detailed Description

FIG. 1 shows a schematic overview with a parking lot 1, on or in which a motor vehicle 2 is moving, and an external server apparatus 3. The parking lot 1 comprises multiple parking spaces 4, in which a vehicle, for example the motor vehicle 2, can be parked. By way of example, here, one of the parking spaces 4 is occupied by a third-party vehicle 5. The parking spaces 4 are defined or delimited by parking space markings. In addition, location markers 6 are provided here by way of example, which can assist with automated recognition of the parking spaces 4.

The motor vehicle 2 comprises a surroundings sensor system 7 for recording surroundings data which depict or characterize respectively current surroundings, i.e. in this case the parking lot 1, in particular. The motor vehicle 2 also comprises an assistance apparatus 8 and a vehicle apparatus 9. The vehicle apparatus 9 may, for example, be controlled by the assistance apparatus 8 or another assistance system of the motor vehicle 2 not shown here for automated or semi-automated operation of the motor vehicle 2. Equally, the vehicle apparatus 9 may be or comprise an assistance system of this kind.

The surroundings sensor system 7, the assistance apparatus 8, and the vehicle apparatus 9 are schematically indicated here coupled to one another by means of an on-board power supply of the motor vehicle 2 configured for signal or data transmission or rather connected to an on-board power supply of this kind.

The assistance apparatus 8 comprises an input interface 10, via which it can gather surroundings data recorded by the surroundings sensor system 7. Said data may be raw data or pre-processed data. Furthermore, the assistance apparatus 8 schematically indicated here comprises a processor 11, a data memory 12, and an output interface 13, which may be interconnected. The surroundings data gathered via the input interface 10 can be processed by means of the processor 11 and data memory 12, which can produce corresponding result data. Said result data can then be output via the output interface 13. For example, the result data can be output via the output interface 13 to a communication module 14. Said communication module 14 can then send the result data to the server apparatus 3. The communication module 14 may be coupled to the assistance apparatus 8 via the output interface 13, but may also be part of the assistance apparatus 8. The assistance apparatus 8 or rather the communication module 14 may, in particular, be configured for bidirectional communication, i.e. also for receiving data from the server apparatus 3.

A method for supporting at least semi-automated vehicle or driving functions of the motor vehicle 2 and/or other vehicles not shown here can be implemented or applied here by means of the motor vehicle 2 and the server apparatus 3.

A basic idea of the method consists in incrementally learning or generating a map based on fleet data. The fleet data may be portions of the surroundings data recorded by the fleet vehicles, in this case, for example, by the motor vehicle 2, and associated object data which designate semantic and/or geometric objects recognized therein by the relevant assistance apparatus 8. Here, such semantic and/or geometric objects may be or include, for example, the parking space markings or parking space boundaries of the parking spaces 4, the location markers 6, walls or boundaries of the parking lot 1, and/or the like. The fleet vehicles, in this case represented by the motor vehicle 2, may thus travel in the parking lot 1 or indeed other parking lots 1 not shown here and in the process perceive or record their surroundings by means of their surroundings sensor system 7 and evaluate or pre-process corresponding surroundings data in order to recognize semantic and/or geometric objects classified as relevant to parking maneuvers. The server apparatus 3 receives corresponding fleet data and accumulates or aggregates same into a global map.

Here, the motor vehicle 2 may, based on the recorded surroundings data, for example camera images, extract from the surroundings data relevant features such as pixels or regions which belong to relevant semantic and/or geometric objects, for example the parking space markings or location markers 6. The motor vehicle 2 or rather the assistance apparatus 8 may temporarily store said features or data portions together with information about which semantic and/or geometric object said features or data portions belong to, i.e. corresponding object data. The object data may, for example, indicate that particular features or data portions belong to a particular parking space marking or to a particular location marker 6 or the like. Said data is then sent by the assistance apparatus 8 or rather of the motor vehicle 2 to the server apparatus 3.

Based on this, the server apparatus 3 may carry out a global 3D reconstruction by means of global bundle adjustment and thus create a global 3D map of the parking lots 1. By evaluating a semantic and/or geometric attribution carried out or generated by the motor vehicle 2 or rather the assistance apparatus 8, relevant objects can be identified and formed in said global map by means of the server apparatus 3.

On the vehicle side, i.e., in this case, in particular by means of the assistance apparatus 8, the semantic and/or geometric objects can be extracted from the surroundings data using prior knowledge of relevant map content, which is for example predefined, i.e. stored in the data memory 12, for example.

Using odometry data or rather vehicle odometry, which describes or characterizes a proper motion of the motor vehicle 2, heuristically reconstructed 3D objects that represent the real objects in the relevant surroundings can be entered into a map, for example by means of the assistance apparatus 8 into a local partial map and/or by means of the server apparatus 3 into the global map. The odometry data may, for example, be determined by means of an inertial measurement unit (IMU), by evaluating speedometer signals, steering angle signals, and/or the like of the motor vehicle 2.

Equally, uncertainty data or uncertainty information, which result, for example, from perception characteristics of the surroundings sensor system 7 and/or a self-assessment of the odometry of the motor vehicle 2 as well as other possible criteria, can be determined for the objects. Said uncertainty information can then, for example during creation of the local partial map, be taken into account and/or sent to the server apparatus 3 for consideration during generation of the global map. The server apparatus 3 may thus fuse the fleet data or partial maps of many fleet vehicles into the global map in consideration of the uncertainty information contained.

The fleet vehicles, in this case represented by the motor vehicle 2, may for example carry out or apply a visual SLAM method (v-SLAM, Visual Simultaneous Localization And Mapping) in order to generate the relevant local partial map, in particular as a 3D map, of the relevant parking space 1. A V-SLAM method of this kind can be applied based on visual or optical surroundings data in order to reconstruct 3D properties, in particular the position and orientation in three dimensions, of objects in the relevant surroundings of the motor vehicle 2. The local partial maps may contain data or information about relevant elements or objects in the relevant surroundings, for example the parking space markings, the location markers 6, walls or boundaries of the relevant parking lot 1, and/other data, for example a trajectory traveled by the motor vehicle 2 in the relevant parking lot 1. The motor vehicle 2 may, for example, use methods or systems such as visual odometry (TVIP) or visual localization in the process or rather in order to recognize or extract corresponding relevant information, for example semantic and/or spatial data.

The motor vehicle 2 may record the surroundings data or rather respectively new surroundings data at strategically sensible points in time, which may be defined by means of one or more predefined criteria. The determination or selection of said points in time may, for example, be route-based, time-based, and/or based on other criteria. For example, a new set of surroundings data can in each case be recorded by way of the surroundings sensor system 7 or gathered by means of the assistance apparatus 8 in each case after 0.5 m has been covered since the last time surroundings data was recorded and/or, for example, once or twice per second. The surroundings sensor system 7 may have a comparatively higher recording rate or recording frequency, for example if the surroundings data recorded by the surroundings sensor system 7 are also used by other apparatuses or systems of the motor vehicle 2. The assistance apparatus 8 can then gather or rather process or use only some of the data actually recorded by the surroundings sensor system 7 in order to limit the data processing workload. The assistance apparatus 8 may temporarily store the gathered surroundings data or process and discard same in each case directly in real time, wherein only corresponding result data, for example the extracted data portions and the corresponding object data, are then preserved. Said result data can then be transmitted directly, i.e. in real time, to the server apparatus 3 or temporarily stored in the assistance apparatus 8, for example in the data memory 12. In the latter case, the corresponding data can then be sent to the server apparatus 3 as and when required, for example at regular predefined time intervals or whenever a sufficiently broadband and stable data connection to the server apparatus 3 is available or can be established.

Overall, the examples described show how map learning or map generation can be implemented for parking applications, for example based on V-SLAM and global map or data fusion.

LIST OF REFERENCE NUMERALS

1 Parking lot
2 Motor vehicle
3 Server apparatus
4 Parking space
5 Third-party vehicle
6 Location marker
7 Surroundings sensor system
8 Assistance apparatus
9 Vehicle apparatus
10 Input interface
11 Processor
12 Data memory
13 Output interface
14 Communication module The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for supporting at least semi-automated vehicle functions in a parking lot, comprising:
   automatically recording surroundings data which characterize respectively current surroundings of a motor vehicle in the parking lot by way of a surroundings sensor system of the motor vehicle;
   automatically processing the surroundings data in order to recognize semantic and/or geometric objects, wherein the surroundings data depict the parking lot or represent same in the form of a point cloud;
      extracting data portions from the surroundings data, wherein the data portions correspond to semantic and/or geometric objects that have been classified as relevant to a parking maneuver and comprise pixels or data points that depict or represent the recognized semantic and/or geometric objects, wherein of the surroundings data, only the extracted data portions together with object data that, as a semantic and/or geometric attribution of the data portions, in each case indicate to which at least one semantic and/or geometric object the data portions correspond, are sent to a server in order to automatically create an overall map.

2. The method of claim 1, wherein parking space markings, travel path boundaries, and/or location markers are predefined as the semantic and/or geometric objects.

3. The method of claim 1, wherein the objects are recognized in the surroundings data and/or the corresponding data portions are extracted from the surroundings data using predefined prior knowledge of relevant map content.

4. The method of claim 1, wherein a trajectory actually traveled by the motor vehicle in the parking lot is determined and also sent to the server.

5. The method of claim 1, wherein the surroundings data are recorded in particular only at points in time determined according to a predefined criterion.

6. The method of claim 5, wherein the criterion defines a predefined route, new surroundings data being recorded in each case after the motor vehicle has covered said route.

7. The method of claim 5, wherein the criterion defines a predefined change in a recording angle of the surroundings sensor system with respect to the surroundings, in particular with respect to a relevant object in the surroundings, new surroundings data being recorded after said change has been achieved.

8. The method of claim 1, wherein uncertainty data that indicate a relevant reliability are determined and taken into account for the objects and/or for the corresponding extracted data portions.

9. The method of claim 8, wherein the uncertainty data are ascertained based on respective recording conditions for the surroundings data, in particular based on an ascertained quality of a calibration of the surroundings sensor system, an ascertained distance between a relevant object and the surroundings sensor system, an ascertained angular position of the relevant object relative to the surroundings sensor system, and/or respectively current visibility and/or weather conditions.

10. The method of claim 8, wherein the uncertainty data are determined based on odometry data that characterize a proper motion of the motor vehicle.

11. The method of claim 1, wherein a local partial map in which the objects classified as relevant are entered, is generated on the vehicle side based on the recorded surroundings data, in particular only based on the extracted data portions and the objects recognized therein and the partial map is sent to the server apparatus.

12. The method of claim 11, wherein odometry data that characterize a proper motion of the motor vehicle are gathered on the vehicle side, and the recognized objects are entered into the partial map using the odometry data.

13. A method for supporting at least one semi-automated vehicle functions of a motor vehicle in a parking lot, comprising by a central server:
   processing data sent to the server by a plurality of motor vehicles of a vehicle fleet;
   generating and/or updating a global map based on the data from different motor vehicles of the vehicle fleet at points in time using global bundle adjustment method; and
   providing the generated and/or updated global map at least partially to at least the motor vehicle in the parking lot for supporting the at least one semi-automated vehicle function of at least the motor vehicle in the parking lot.

14. An assistance system for a motor vehicle, comprising an input interface for gathering surroundings data, a computer-readable data memory, a processor coupled thereto, and an output interface for outputting result data generated based on the surroundings data, wherein the assistance system is configured to:

automatically record surroundings data which characterize respectively current surroundings of the motor vehicle in the parking lot by way of a surroundings sensor system of the motor vehicle;

automatically process the surroundings data in order to recognize semantic and/or geometric objects, wherein the surroundings data depict the parking lot or represent same in the form of a point cloud;

extract data portions from the surroundings data, wherein the data portions correspond to semantic and/or geometric objects that have been classified as relevant to a parking maneuver and comprise pixels or data points that depict or represent the recognized semantic and/or geometric objects, wherein of the surroundings data, only the extracted data portions together with object data that, as a semantic and/or geometric attribution of the data portions, in each case indicate to which at least one semantic and/or geometric object the data portions correspond, are sent to a server in order to automatically create an overall map.

15. A motor vehicle, comprising a surroundings sensor system, an assistance system according to claim 14, and a communication interface for sending data to a server via a wireless data connection.

16. The method of claim 2, wherein the objects are recognized in the surroundings data and/or the corresponding data portions are extracted from the surroundings data using predefined prior knowledge of relevant map content.

17. The method of claim 2, wherein a trajectory actually traveled by the motor vehicle in the parking lot is determined and also sent to the server.

18. The method of claim 3, wherein a trajectory actually traveled by the motor vehicle in the parking lot is determined and also sent to the server.

19. The method of claim 2, wherein the surroundings data are recorded in particular only at points in time determined according to a predefined criterion.

20. The method of claim 3, wherein the surroundings data are recorded in particular only at points in time determined according to a predefined criterion.

* * * * *